(12) United States Patent
Amin et al.

(10) Patent No.: US 11,614,730 B2
(45) Date of Patent: Mar. 28, 2023

(54) EMBEDDED AND/OR POOLED ROBOTIC PROCESS AUTOMATION ROBOTS

(71) Applicant: UiPath, Inc., New York, NY (US)

(72) Inventors: Umesh Amin, Redmond, WA (US); Danut Boanta, Bucharest (RO)

(73) Assignee: UiPath, Inc., New York, NY (US)

( * ) Notice: Subject to any disclaimer, the term of this patent is extended or adjusted under 35 U.S.C. 154(b) by 270 days.

(21) Appl. No.: 17/064,523

(22) Filed: Oct. 6, 2020

(65) Prior Publication Data

US 2022/0107624 A1    Apr. 7, 2022

(51) Int. Cl.
| | |
|---|---|
| *G05B 19/41* | (2006.01) |
| *B25J 9/00* | (2006.01) |
| *G05B 19/4155* | (2006.01) |
| *B25J 3/00* | (2006.01) |

(52) U.S. Cl.
CPC ............ *G05B 19/4155* (2013.01); *B25J 3/00* (2013.01); *B25J 9/0084* (2013.01); *G05B 2219/39371* (2013.01)

(58) Field of Classification Search
CPC ....... G05B 19/4155; G05B 2219/39371; B25J 3/00; B25J 9/0084; G06Q 10/109; G06Q 10/0631
See application file for complete search history.

(56) References Cited

U.S. PATENT DOCUMENTS

| | | | |
|---|---|---|---|
| 10,735,522 B1 | 8/2020 | Sathianarayanan et al. | |
| 10,855,625 B1* | 12/2020 | Viswanathan | H04L 51/02 |
| 2017/0269972 A1 | 9/2017 | Hosabettu et al. | |
| 2019/0130094 A1* | 5/2019 | Votaw | G06F 21/552 |
| 2019/0303779 A1* | 10/2019 | Van Briggle | G06F 9/485 |
| 2020/0047334 A1 | 2/2020 | Mummigatti et al. | |
| 2020/0067923 A1 | 2/2020 | Dasari et al. | |
| 2020/0180148 A1 | 6/2020 | Nanal et al. | |
| 2020/0180155 A1 | 6/2020 | Hall | |
| 2020/0233707 A1 | 7/2020 | Ramamurthy et al. | |
| 2020/0262063 A1* | 8/2020 | Perera | B25J 9/1661 |
| 2020/0364083 A1* | 11/2020 | Walby | G06Q 10/0631 |

FOREIGN PATENT DOCUMENTS

| | | |
|---|---|---|
| CN | 109636309 A | 4/2019 |
| CN | 110648054 A | 1/2020 |

OTHER PUBLICATIONS

International Search Report & Written Opinion, dated Jan. 3, 2022, PCT Application No. PCT/US21/51444.

* cited by examiner

*Primary Examiner* — Kira Nguyen
(74) *Attorney, Agent, or Firm* — LeonardPatel PC; Michael A. Leonard, II; Sheetal S. Patel

(57) ABSTRACT

Embedded and/or pooled robotic process automation (RPA) robots are disclosed. A master robot initiates one or more RPA robots in a deterministic and/or probabilistic manner. For instance, when a step in an RPA workflow of the master robot is encountered where an action is not clear, some data is missing, there are multiple possible branches, etc., one or more embedded and/or pooled minion robots may be called upon by the master robot to determine the next action to take, to retrieve missing data, to determine which branch is appropriate, etc. The master robot may perform orchestration functionality with respect to the minion robot(s).

29 Claims, 18 Drawing Sheets

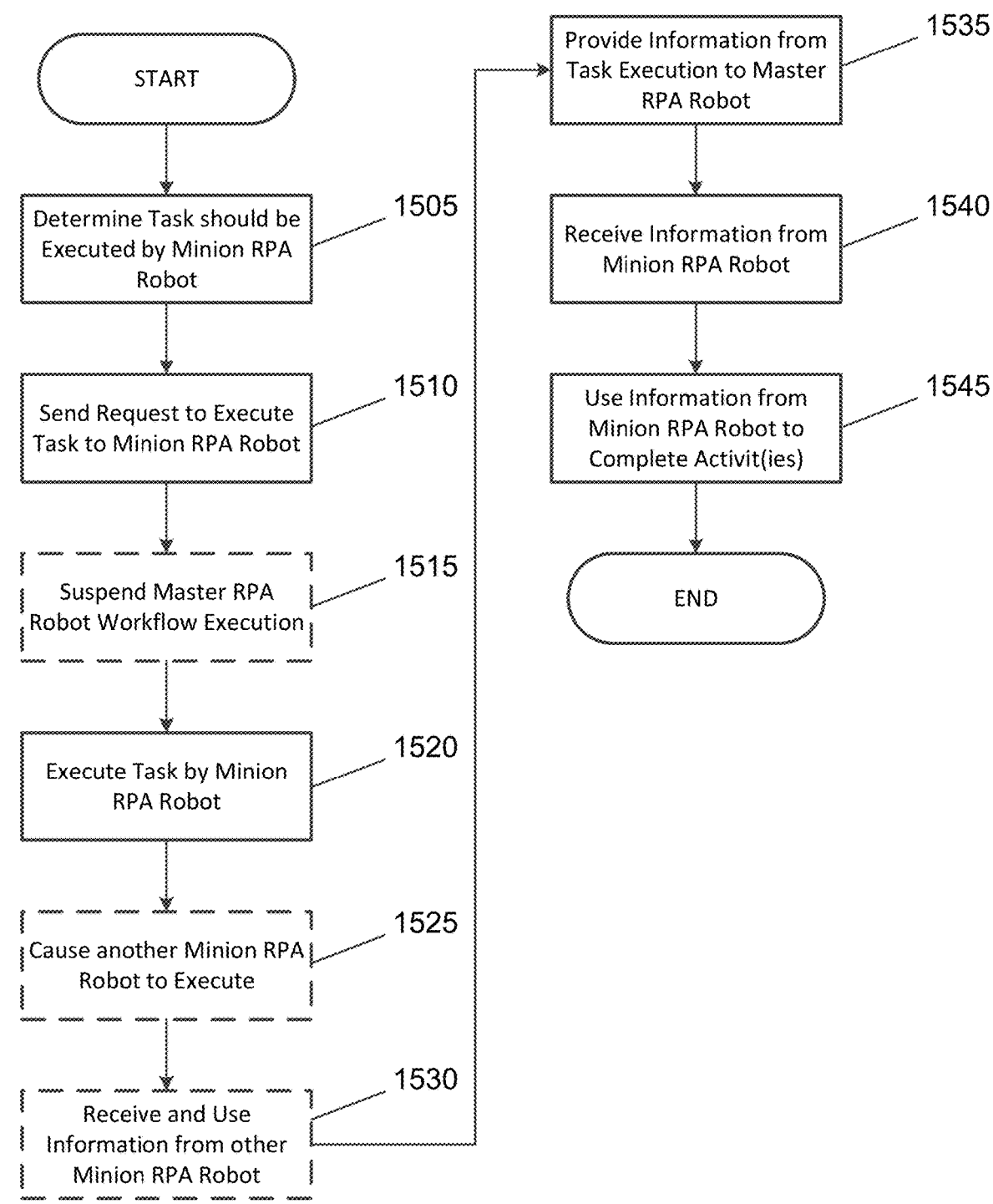

EMBEDDED AND/OR POOLED ROBOTIC PROCESS AUTOMATION ROBOTS

FIELD

The present invention generally relates to robotic process automation (RPA), and more specifically, to embedded and/or pooled RPA robots.

BACKGROUND

RPA robots may be orchestrated via a conductor application. The conductor application may connect and execute the RPA robots from a centralized point and may control scheduling of the RPA robots. However, RPA robots are typically executed individually to carry out the tasks of their respective workflows. Also, conventionally, RPA robots do not control other RPA robots. Accordingly, an improved and/or different approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to embedded and/or pooled RPA robots.

In an embodiment, a computer program is embodied on a non-transitory computer-readable medium. The computer program is configured to cause at least one processor to determine, by a master RPA robot, that a task should be executed by a minion RPA robot and send a request to execute the task to the minion RPA robot, by the master RPA robot. The computer program is also configured to cause the at least one processor to receive, by the master RPA robot, information from the minion RPA robot pursuant to the execution of the task and use the information received from the minion RPA robot, by the master RPA robot, to complete at least one activity associated with a workflow of the master RPA robot.

In another embodiment, a computer-implemented method includes determining, by a master RPA robot, that a task should be executed by a minion RPA robot and sending a request to complete the task to the minion RPA robot, by the master RPA robot. The computer-implemented method also includes executing the task, by the minion RPA robot, based on the request from the master RPA robot. The computer-implemented method further includes receiving, by the master RPA robot, information from the minion RPA robot pursuant to the execution of the task and using the information received from the minion RPA robot, by the master RPA robot, to complete at least one activity associated with a workflow of the master RPA robot.

In yet another embodiment, a computer program is embodied on a non-transitory computer-readable medium. The computer program is configured to cause at least one processor to receive a request to execute a task from a master RPA robot, by a minion RPA robot. The computer program is also configured to cause the at least one processor to execute the task, by the minion RPA robot, based on the request from the master RPA robot and provide information to the master RPA robot pursuant to the execution of the task, by the minion RPA robot. The minion RPA robot is embedded within the master RPA robot, the minion RPA robot is part of a robot pool, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 15 is a flowchart illustrating a process for implementing embedded and/or pooled RPA robot functionality, according to an embodiment of the present invention.

Unless otherwise indicated, similar reference characters denote corresponding features consistently throughout the attached drawings.

DETAILED DESCRIPTION OF THE EMBODIMENTS

Figure 1:
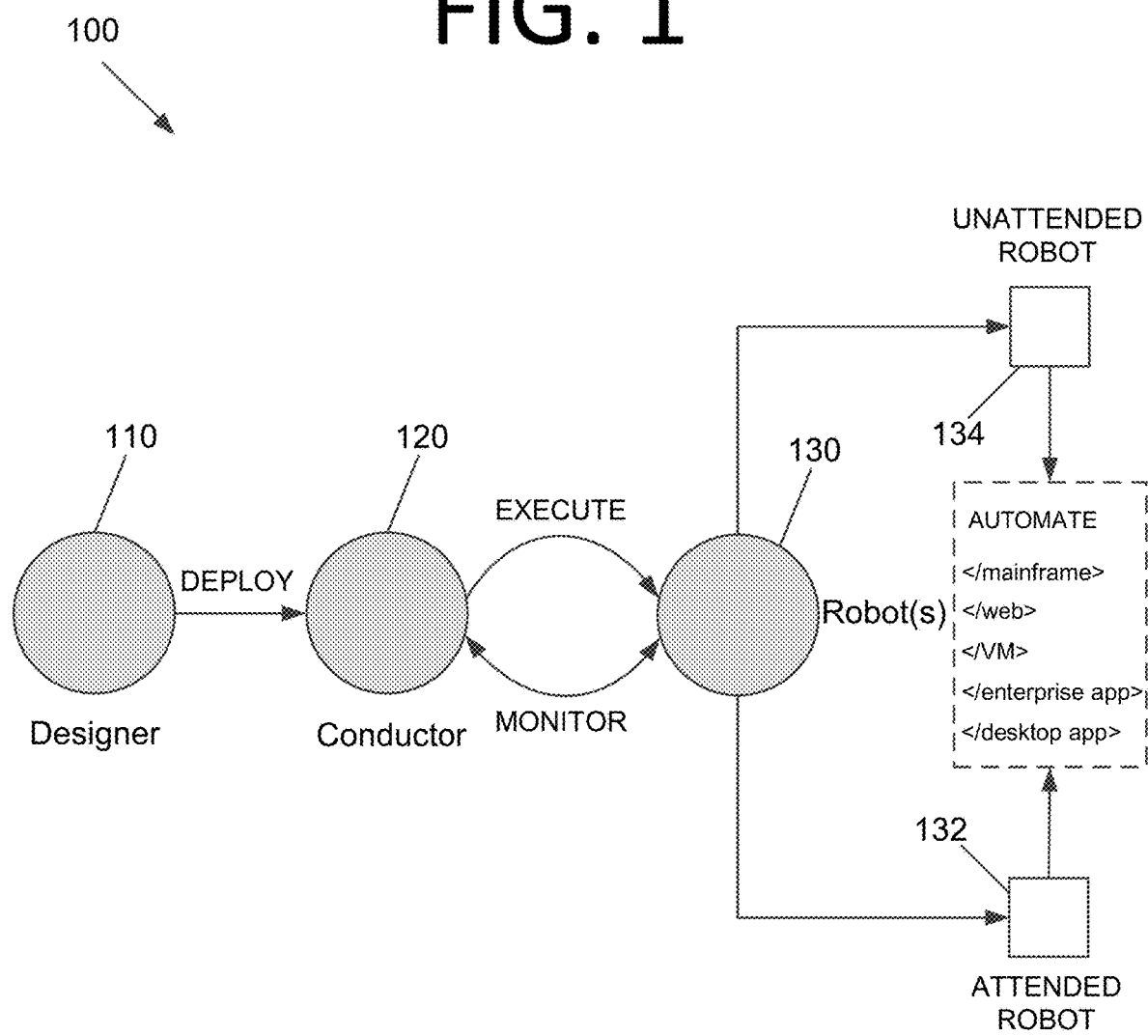
FIG. 1 is an architectural diagram illustrating a robotic process automation (RPA) system, according to an embodiment of the present invention.

Some embodiments pertain to embedded and/or pooled RPA robots. Typically, a single robot iterates through its workflow. However, some embodiments employ a master robot that initiates one or more RPA robots in a deterministic and/or probabilistic manner. For instance, when a step is encountered where an action is not clear, some data is missing, there are multiple possible branches, etc., one or more embedded and/or pooled minion robots may be called upon by the master robot to determine the next action to take, to retrieve missing data, to determine which branch is appropriate, etc. In some embodiments, the master robot may perform orchestration functionality with respect to the minion robot(s).

In some embodiments, a minion robot may be embedded as part of a master robot or included as part of a minion robot pool. As used herein, "embedded" robots are contained within the code of the master robot, and may execute as loops, separate threads, subprocesses, etc. "Pooled" robots may exist as pre-instantiated callable processes and/or instantiated on-demand processes that can be used by the master robot as part of a larger function. In some embodiments, a combination of embedded and pooled RPA robots may be used without deviating from the scope of the invention.

In some embodiments, the master robot may suspend its operation and wait for one or more minion robots to complete their operations. In certain embodiments, the master robot may continue its operation while the minion robot(s) are carrying out their workflow logic. In some embodiments, any desired number and/or type of minion robots may be executed in series and/or in parallel without deviating from the scope of the invention. For instance, multiple embedded robots may execute one after another (serial), multiple embedded robots may execute at the same time (parallel), or in series and parallel embodiments, at multiple minion RPA robots may execute at the same time for at least one stage of the serial operation chain.

In some embodiments, minion robots may be individually configured to interact with respective systems. For instance, one or more minion robots may interact with an SQL database, one or more other minion robots may interact with Salesforce®, still other RPA robots may interact with SAP®, etc. In certain embodiments, rather than interacting with specific software generally, one or more minion robots may be configured to interact with a specific aspect or instance of the software. For example, minion robots may be configured to interact with a specific website, a certain spreadsheet, a type of invoice, a part thereof, etc.

By way of nonlimiting example, consider a call center implementation for a wireless carrier. A master robot may be implemented that guides a representative through interactions with a customer. The master robot may also be configured to perform speech recognition record what the caller says, analyze the detected speech text, and retrieve certain information therefrom.

If a customer calls and states that his or her data usage on an invoice is incorrect, the customer service representative may ask for the customer's name and phone number. This information alone may be insufficient to address the customer's problem. Furthermore, the master robot may not be able to immediately determine from this information what the problem is and/or how to solve it.

However, based on the customer's name and phone number, recognized speech indicating that there is a data usage problem, etc., the master robot may task one or more embedded and/or pooled minion robots to begin exploring to find additional information. For instance, the master robot may task one minion robot with looking up the customer's account information, task another minion robot to look up the subscription agreement and find certain information in the subscription system, task yet another minion robot to find information from the last billing statement, etc. This information may then be used by the master robot to provide the customer service representative with the information that he or she needs to address the issue, to suggest a solution to the customer service representative, to automatically address the problem, etc. If there is insufficient information for one or more of the minion robots to complete its task, the master robot may be notified by the minion robot, and the master robot may then request that the call center representative to obtain this information from the customer.

In some embodiments, the master robot has a pooled and/or embedded "stable" of minion robots that can perform various tasks. This stable may be extensible as new robots are developed and/or a new version of the master robot is created. In certain embodiments, the operation of the master robot may be suspended while one or more of the minion robots is running. However, in other embodiments, the master robot may continue performing logical operations and/or tasks while the minion robot(s) are executing their workflow logic.

By way of another nonlimiting example, consider a document processing scenario, where structured and/or unstructured data may be received, a different approach is used for different types of structured and/or unstructured data, and it is not known in advance what type(s) of data will be received. The master robot may begin processing various documents, and when the type of data in a given document is determined, the master robot may task one or more respective minion robots configured for that type to perform the document processing. The types may be determined by whether the data is structured or unstructured, a certain language being used in the invoice, a certain customer being named in the invoice, a certain invoice layout, a number format, a combination thereof, etc. In some embodiments, a first minion robot or the master robot may sort the invoice information, and one or more other minion robots may act on various parts of the sorted information (e.g., a set of financial information, a set of address information, a set of text for machine translation into another language, etc.).

By way of yet another non-limiting example, consider a test automation scenario. Test automation is the practice of running tests on software automatically, managing test data, and utilizing results to improve software quality. In test automation, testing generally is performed in accordance with trees, and different forks may occur that guide the way testing is done. In some embodiments, when a fork in the tree is encountered, the master robot may be suspended while one or more minion robots look for further information to determine which branch to take. In some embodiments, the RPA robots may be capable of handling a null set.

By way of still another non-limiting example, consider a process discovery scenario where the interactions of multiple different users with their respective computing systems are being analyzed. The master robot may orchestrate the overall process discovery functionality. A minion robot may be tasked with collecting data from each user and merging the collected data for correlation, for example. This operation may be AI-based in some embodiments.

In some embodiments, AI-based master/minion robots may be used for process discovery. For example, consider a scenario where a department manages payroll for 100,000 employees. Minion robots could be deployed to employee computing systems to record user interactions. For instance, minion robots may collect data from their respective computing systems and master robot(s) may adjust vacation time, payroll, etc. accordingly based on AI/ML analysis. The minion robots could then send the detected vacation scheduling information to a minion robot on a server that collects this information and pools it for processing by a master robot, which calls an AI/ML model to correlate the user interactions and figure out what process(es) the users are using. Such AI/ML-enabled master robots could potentially determine that users are causing the same outcome in different ways, such as scheduling vacation time.

In some embodiments, a "multi-nested" scenario is possible, where a master robot calls a first layer of minion robots, the first layer of minion robots calls a second layer of minion robots, the second layer of minion robots calls a third layer of minion robots, etc. In some embodiments, some or any minion robots may call any other minion robots. Such embodiments may allow the robots more flexible and robust such that they can handle more complex scenarios.

In some embodiments, artificial intelligence (AI) may be used. For example, the master robot may employ a machine learning (ML) model that is trained by providing minion robot selections, input data, and outcomes as inputs to the ML model. The ML model may be trained with this data initially to learn what minion robot combinations seem to work well for certain scenarios and which do not. Once trained, the AI/ML model may be used to inform the master robot's selection of minion robots for respective tasks. The AI/ML model may be trained at the global or local level.

In some embodiments, minion robots may be part of a "toolkit" for use by one or more master robots. For example, minion robots may perform respective tasks that provide the master robot(s) with more robust functionality. Additionally or alternatively, the minion robots may help the master robot(s) to find further information where the next action that should be taken is currently unknown.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
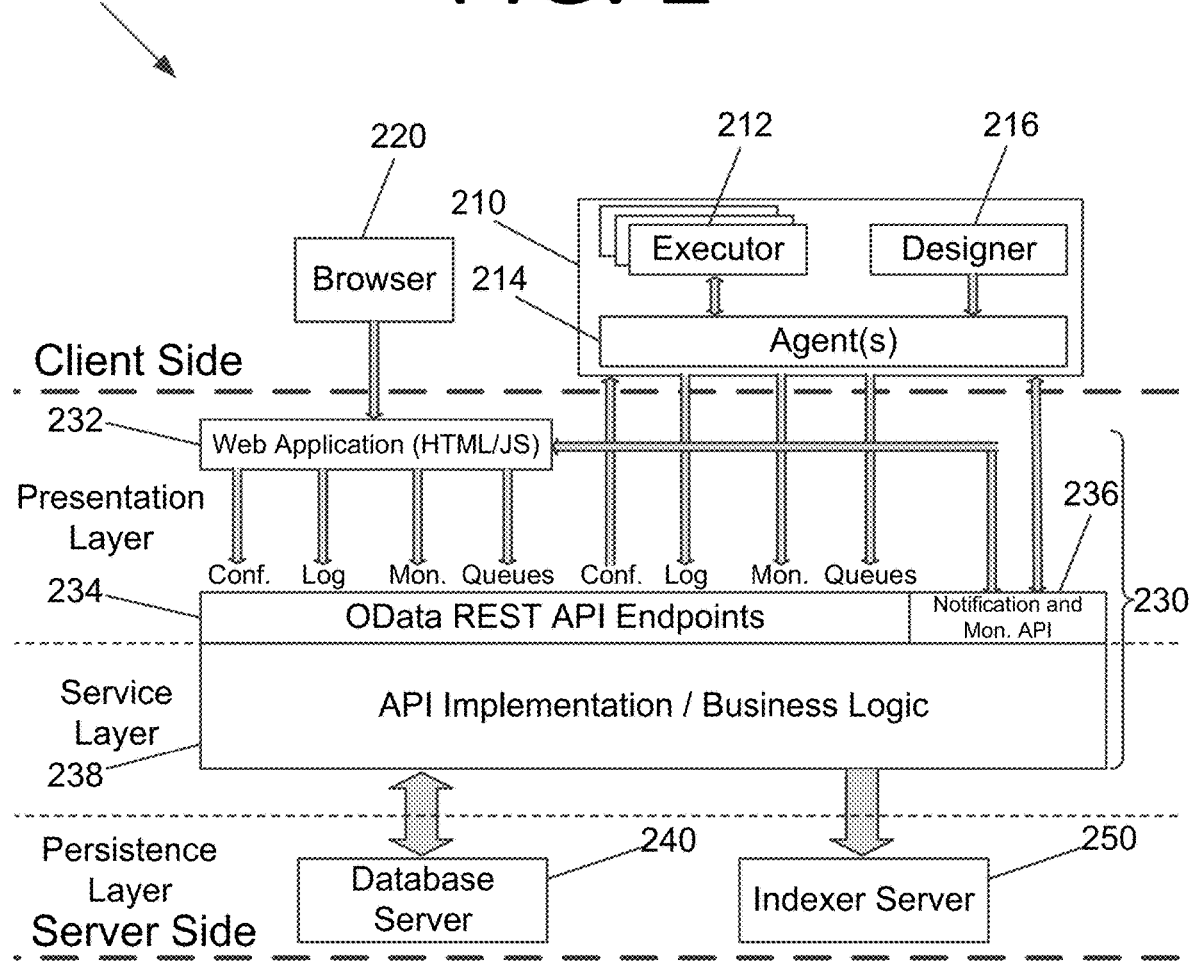
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
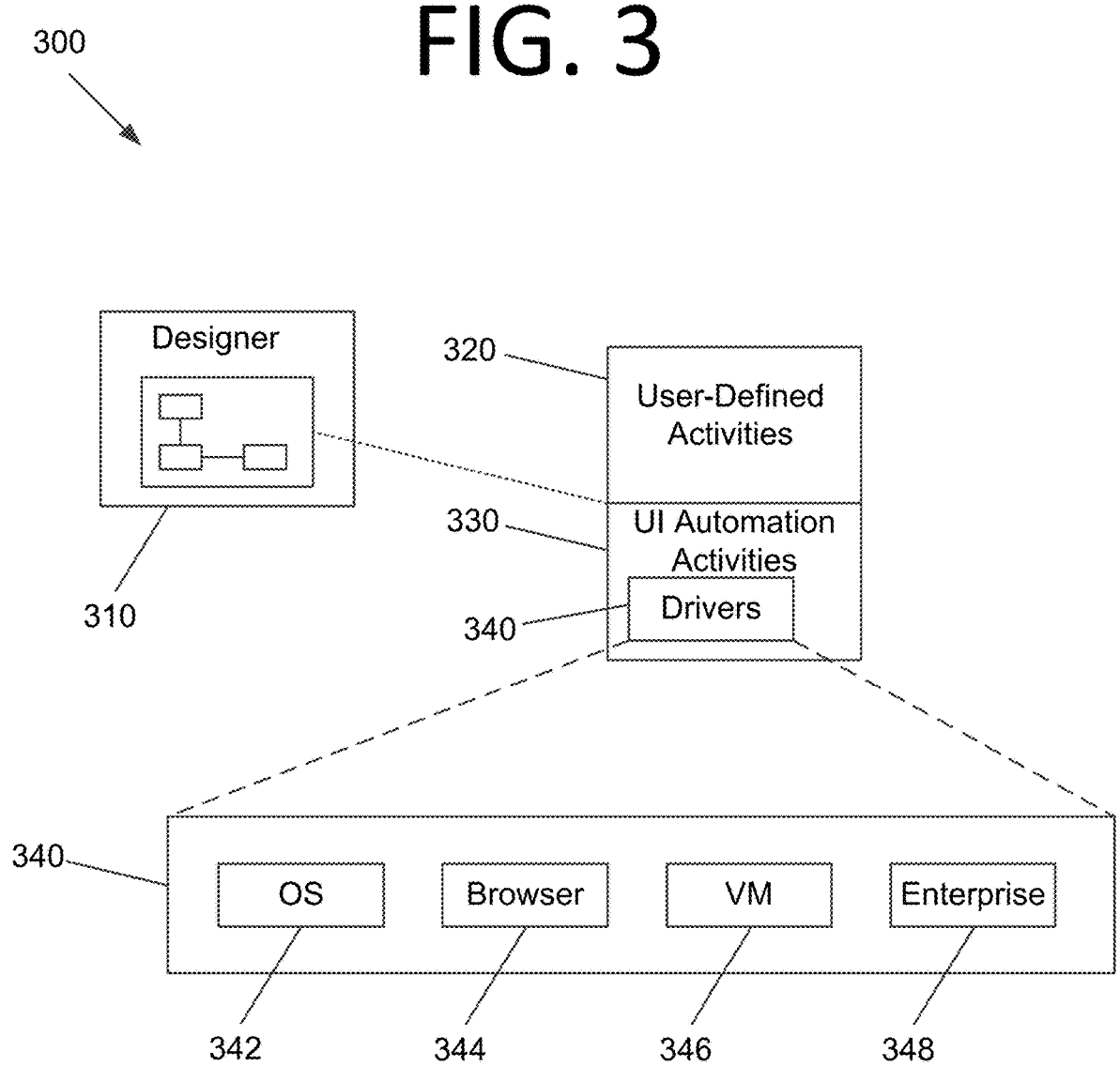
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
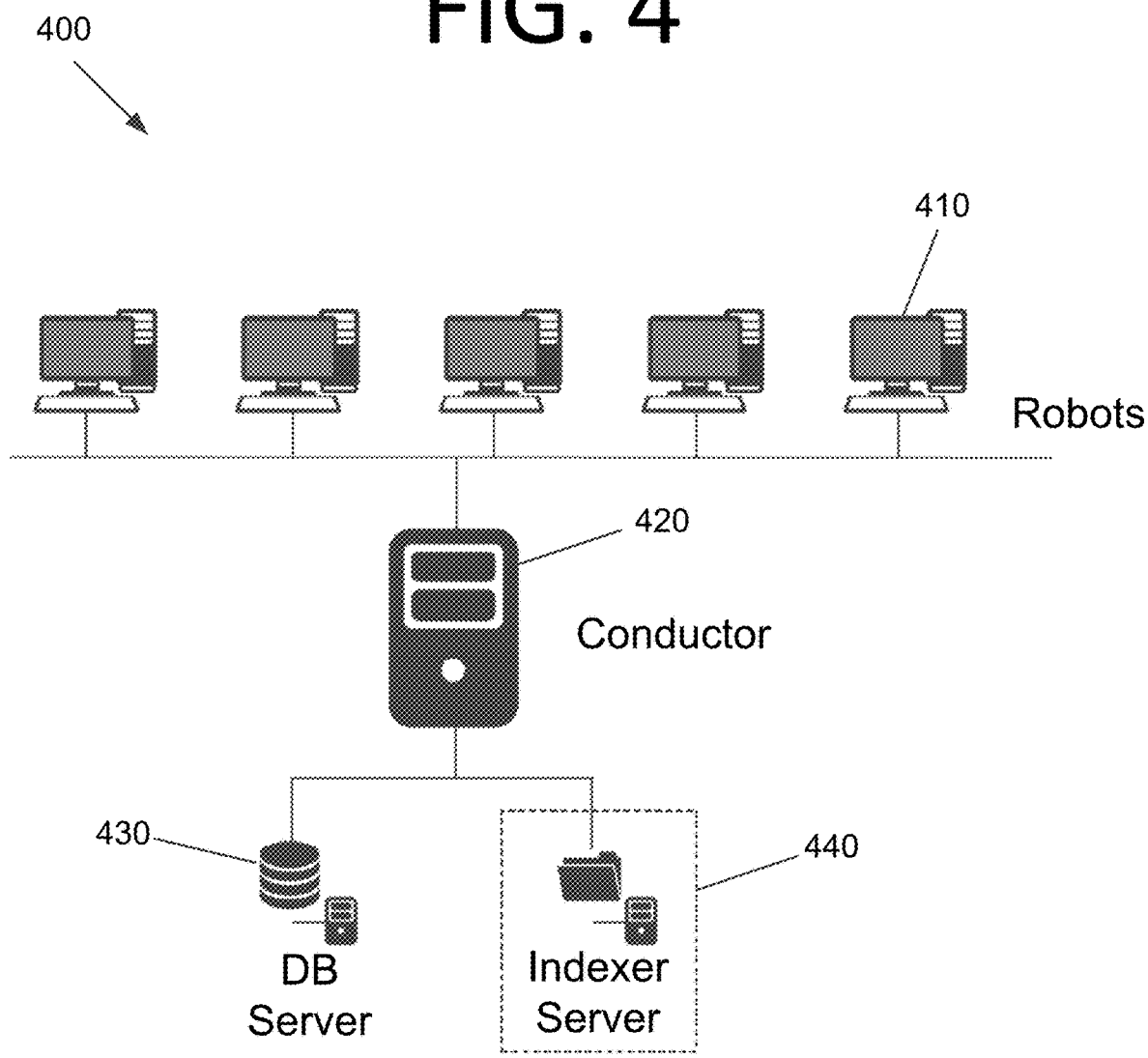
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
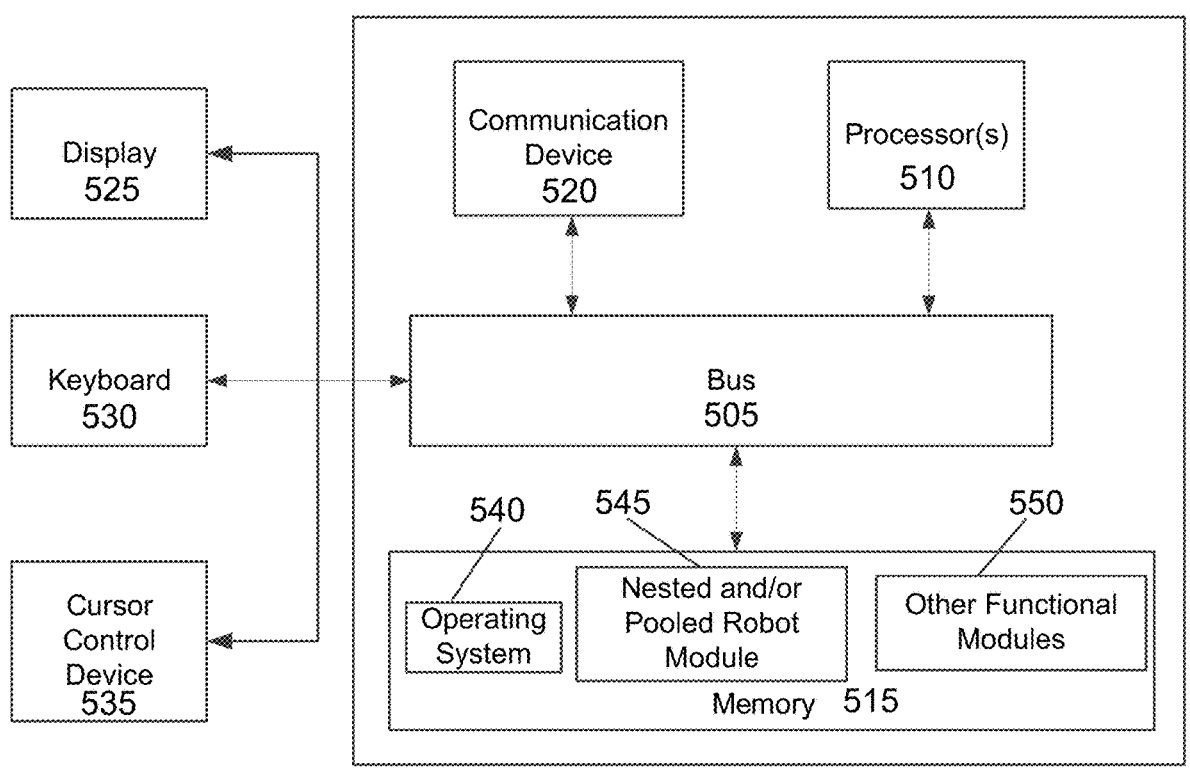
FIG. 5 is an architectural diagram illustrating a computing system configured to implement embedded and/or pooled RPA robots, according to an embodiment of the present invention.

FIG. 5 is an architectural diagram illustrating a computing system 500 configured to implement embedded and/or pooled RPA robots, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an embedded and/or pooled robot module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
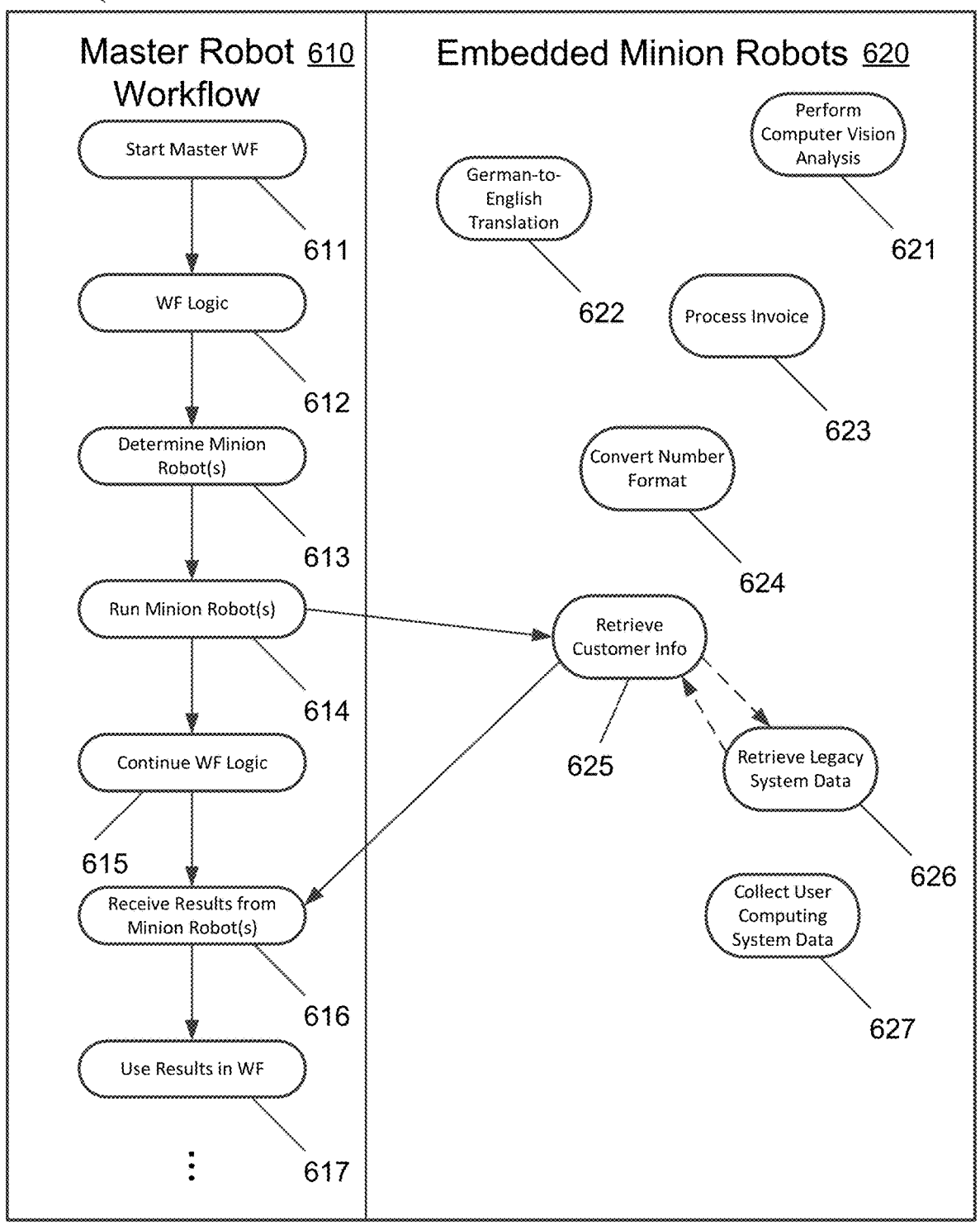
FIG. 6 is a conceptual diagram illustrating a master RPA robot with a master robot workflow and embedded minion robots, according to an embodiment of the present invention.

FIG. 6 is a conceptual diagram illustrating a master RPA robot 600 with a master robot workflow 610 and embedded minion robots 620, according to an embodiment of the present invention. Master robot workflow 610 starts at 611 and begins performing its workflow logic at 612. Workflow logic 612 may involve executing workflow activities including, but is not limited to, interacting with user interface (UI) elements of an application, retrieving data, calling AI/ML models, etc.

At a point in master robot workflow, one or more activities are encountered that determine at 613 which minion robot(s) of embedded minion robots 620 to call. In this embodiment, embedded minion robots 620 are embedded within the logic of master robot 600 and include a CV analysis robot 621, a German-to-English translation robot 622, an invoice processing robot 623, a number format conversion robot 624, a customer information retrieval robot 625, a legacy system data retrieval robot 626, and a user computing system data collection robot 627. However, any suitable minion robot(s) may be used for any suitable purpose without deviating from the scope of the invention.

Based on the determination at 613, the determined minion robot(s) (in this example, customer information retrieval robot 625) are run at 614. In this embodiment, master robot 600 continues its workflow logic at 615. However, in some embodiments, master robot 600 may pause and wait for minion robot(s) to complete one or more tasks, provide one or more results, etc. In some embodiments, minion robots may call other minion robots. For instance, in FIG. 6, customer information retrieval robot 625 may call legacy system data retrieval robot 626 to obtain some or all of the information required for its operation. After the customer information is retrieved, master robot 600 receives this information at 616 from customer information retrieval robot 625. Master robot 600 then uses these results in its ensuing workflow activities at 617.

Figure 7:
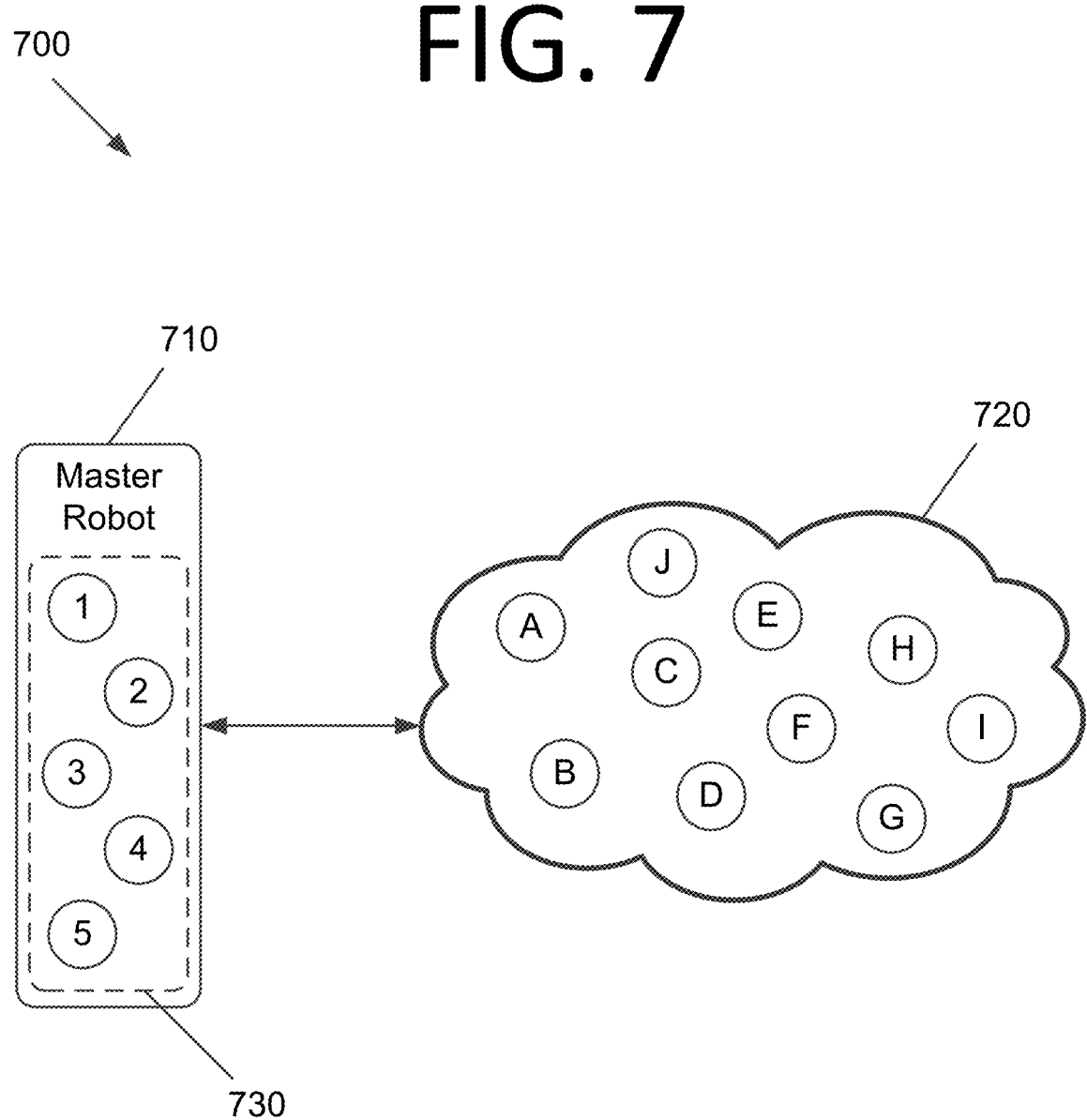
FIG. 7 illustrates an embedded and pooled master/minion RPA robot system architecture, according to an embodiment of the present invention.

Per the above, in some embodiments, a pool of minion robots may be used. Such a scenario 700 is shown in FIG. 7. Master robot 710 can call any of minion robots A-J of robot pool 720 to perform their respective tasks. Minion robots A-J may be pre-instantiated processes that listen for calls from multiple master robots, may be exclusively available to master robot 710 only, may be instantiated by master robot 720 or some other process when needed, may include a combination of pre-instantiated and instantiated on-demand minion robots, etc. In some embodiments, master robot 710 also includes its own embedded "pool" 730 of minion robots 1-5.

Figure 8A:
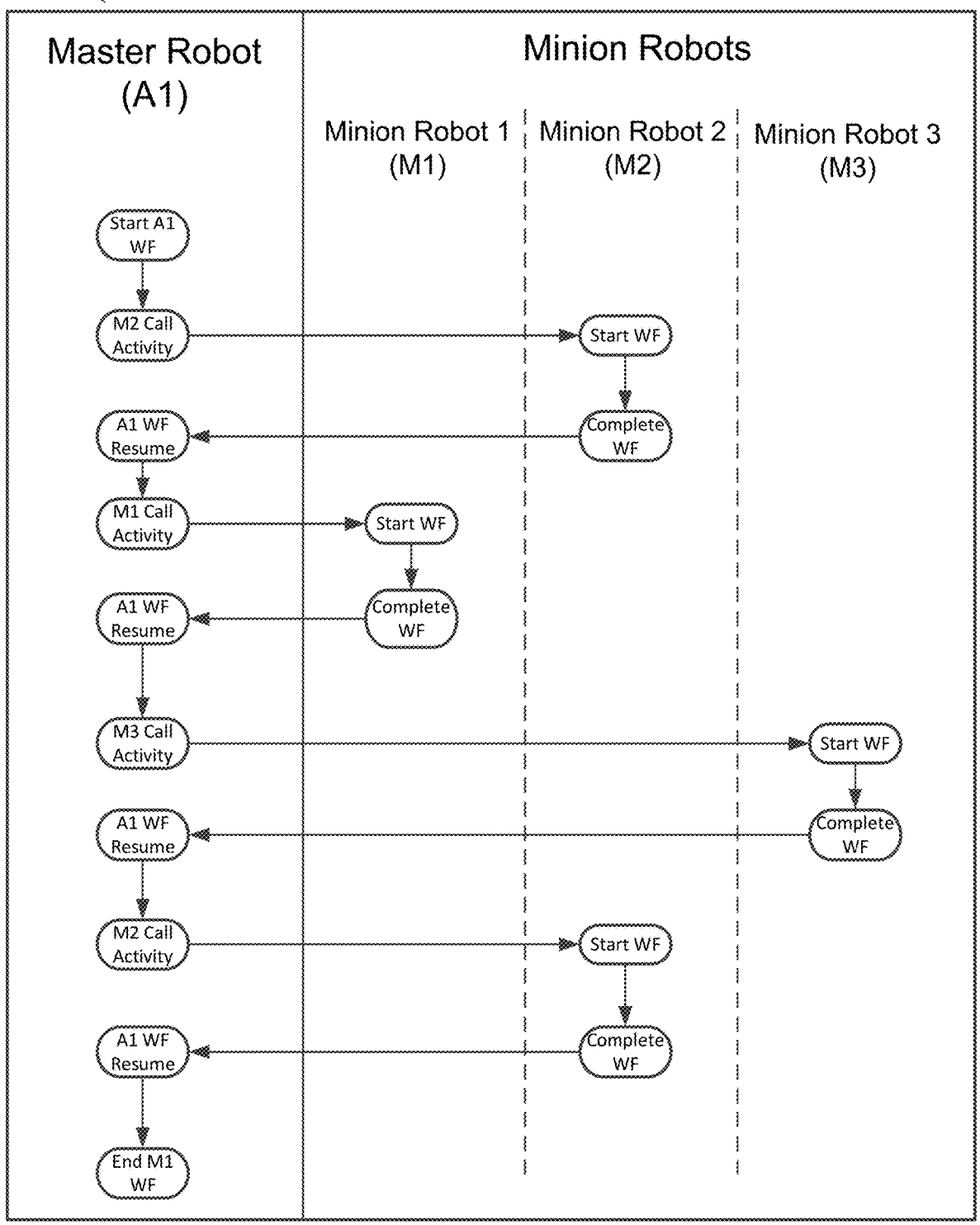
FIG. 8A is a flow diagram illustrating a scenario where a master robot calls multiple minion robots in its workflow, according to an embodiment of the present invention.

FIG. 8A is a flow diagram illustrating a scenario 800 where a master robot A1 calls multiple minion robots M1, M2, M3 in its workflow, according to an embodiment of the present invention. A1 begins executing its workflow and reaches an activity that calls for M2 to perform a task. A1 causes M2 to execute its workflow via inter-process communication (IPC), writing to a file or database, or some other mechanism, and the calling activity waits. During this time, A1 may perform other tasks in some embodiments.

After M2 completes its workflow, M2 notifies A1 and/or provides information obtained while M2 carried out its task, and A1 resumes execution until it reaches an activity that calls for M1. A1 causes M1 to execute and/or to perform a task and the calling activity waits. Once again, A1 may perform other tasks while waiting for M1 in some embodiments.

After M1 completes its process or task, M1 notifies A1 and/or provides information obtained while M1 carried out its task, and A1 resumes execution until it reaches an activity that calls for M3 to complete a workflow. A1 causes M3 to execute its workflow and the calling activity waits. Once again, A1 may perform other tasks while waiting for M3 in some embodiments.

After M3 completes its workflow, M3 notifies A1 and/or provides information obtained while M3 carried out its task, and A1 resumes execution until it reaches an activity that once again calls for M2. This may be the same instance of M2 as previously executed or a different instance. In some embodiments, M2 may execute different logic than the first time that M2 was called. A1 causes M2 to execute its workflow and the calling activity waits. Yet again, A1 may perform other tasks while waiting for M2 in some embodiments. After M2 completes its workflow, M2 notifies A1 and/or provides information obtained while M2 carried out its task, and A1 resumes execution until the workflow of A1 is completed.

In some embodiments, A1 may include one or more "invoke workflow" activities and/or an "invoke process" activities that may invoke minion RPA robot(s) (e.g., M1, M2, and/or M3) and/or other processes. Such an activity may start the respective minion RPA robot(s) and/or process(es), communicate with RPA robot(s) and/or process(es) that are already running, etc. These activities may be created when an RPA developer develops the workflow for A1.

During execution, A1 may communicate with M1, M2, and M3 via IPC, and vice versa. For instance, A1 may send comments and requests to M1, M2, and M3, A1 may receive status messages, results, and error messages from M1, M2, and M3, etc. In this manner, A1 may act as a main RPA robot that controls minion robots and/or other processes (e.g., applications). In certain embodiments, A1, M1, M2, and/or M3 may operate in parallel.

Figure 8B:
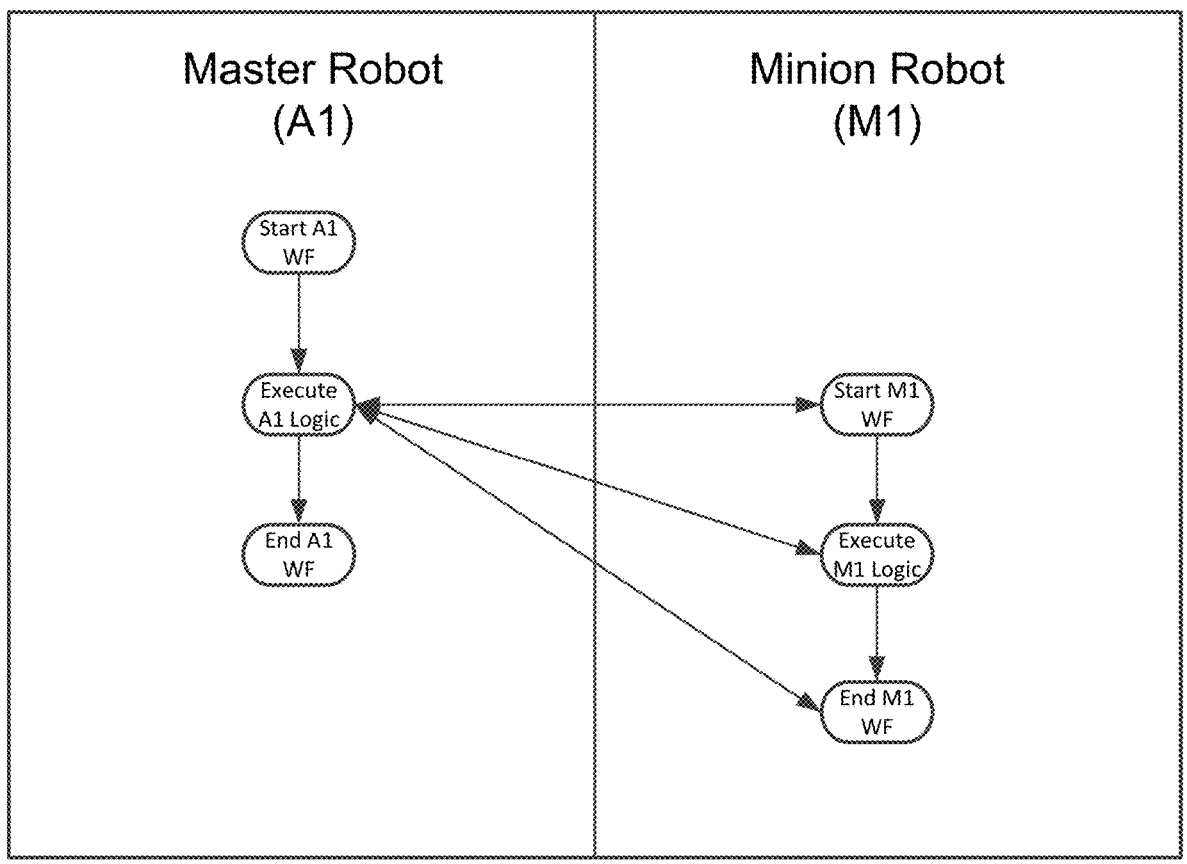
FIG. 8B is a flow diagram illustrating a scenario where a master robot and a minion robot execute in parallel, according to an embodiment of the present invention.

In some embodiments, A1 may perform all interactions with applications. Thus, minion robots M1, M2, and M3 may perform supporting tasks for master robot A1. In certain embodiments, at least some workflow activities of A1, M1, M2, and/or M3 may be executed in parallel. One such example is shown in flow diagram 810 of FIG. 8B, where M1 is executed based on the logic of A1 and execution occurs in parallel. Communications may be sent between A1 and M1 during execution of M1. However, in certain embodiments, M1 may complete its execution independently, and may even complete execution of its workflow after A1 ends.

In certain embodiments, a standardized communication format may be used for communications between the master robot and the minion robots. For instance, master and minion robot processes may exchange Extensible Application Markup Language (XAML) data. This helps to ensure that communications are in a format that the respective processes can recognize.

Figure 8C:
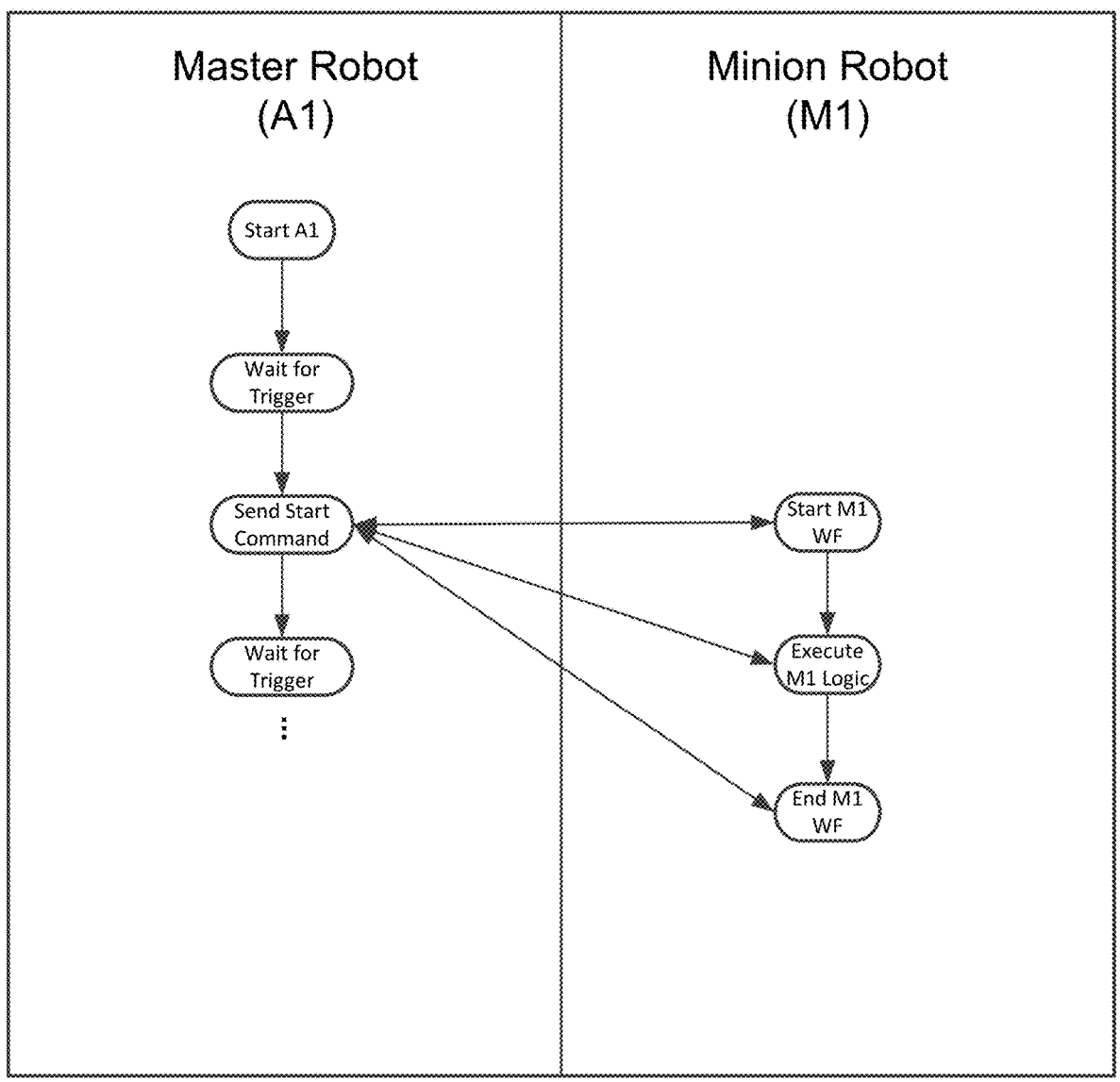
FIG. 8C is a flow diagram illustrating a scenario where a master robot executes a minion robot based on a trigger, according to an embodiment of the present invention.

In some embodiments, the execution of the minion robot(s) may be based on a trigger from the master robot. FIG. 8C is a flow diagram 820 illustrating a scenario where a master robot executes a minion robot based on a trigger, according to an embodiment of the present invention. A master robot A1 begins executing and waits for a trigger. The trigger may include, but is not limited to, receiving information or a command from another process, a logical condition being satisfied, certain data being received, another process starting or completing, a combination thereof, etc. After the trigger is received, A1 starts execution of a minion robot M1. Communications may be sent between A1 and M1 during the operation of M1. A1 then waits for another trigger and M1 executes its workflow.

Figure 9:
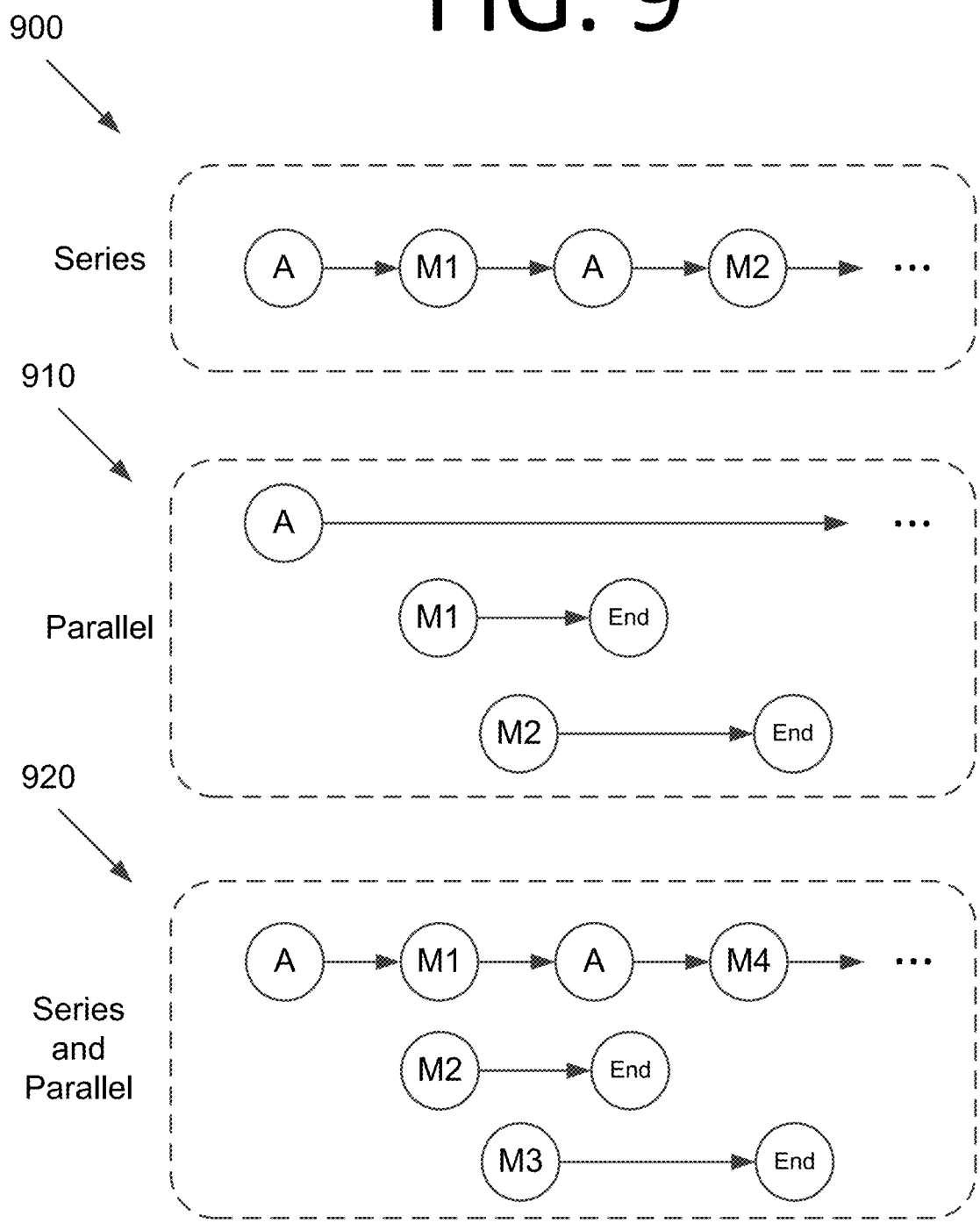
FIG. 9 illustrates an example series execution scenario, parallel execution scenario, and combined series and parallel execution scenario, according to some embodiments of the present invention.

Per the above, in some embodiments, the master robot runs in series with the minion robot(s), in parallel with the minion robot(s), or both. FIG. 9 illustrates an example series execution scenario 900, an example parallel execution scenario 910, and an example combined series and parallel execution scenario 920. In series execution scenario 900, master robot A1 begins executing its workflow, calls minion robot M1, and waits for M1 to complete its task(s). A1 then resumes executing its workflow, calls minion robot M2, and waits for M2 to complete its task(s) before A1 resumes workflow execution.

In parallel execution scenario 910, A1 continues executing while minion robots M1 and M2 execute their workflows. Various minion robots may start and end execution at different times while A1 is running. In combined series and parallel execution scenario 920, minion robots M1 and M4 run in series with A1. However, execution of minion robots M2 and M3 occurs in parallel with the series execution chain.

Figure 10A:
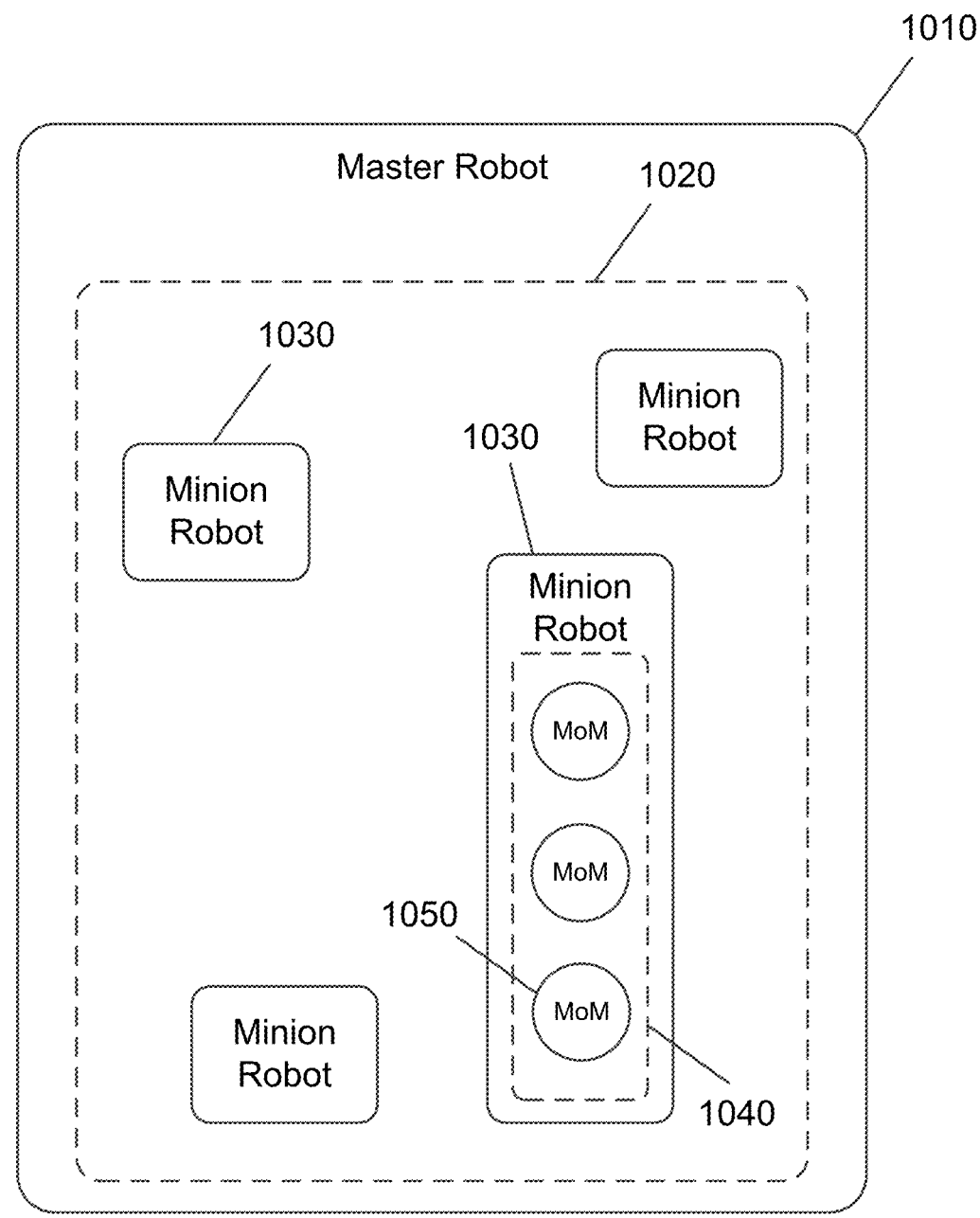
FIG. 10A illustrates an architecture where a master robot has embedded minion robots, and an embedded minion robot has its own embedded sub-minion or minion-of-minion (MoM) robots, according to an embodiment of the present invention.

In some embodiments, nested embedded minion robot and/or nested pooled minion robot architectures may be used. For example, FIG. 10A illustrates an architecture 1000 where a master robot 1010 has a collection 1020 of embedded minion robots 1030, and one embedded minion robot 1030 has its own collection 1040 of embedded sub-minion or minion-of-minion (MoM) robots 1050. Master robot 1010 can call its direct minion robots 1030, and minion robot 1030 including embedded MoM robots 1050 can call these. In some embodiments, master robot 1010 may also be able to call MoM robots 1050. In certain embodiments, minion robots 1030 may be able to call the MoM robots of other minion robots. Any robot calling rules and/or limitations, number of robots, and/or arrangement of nested layers of sub-minion robots may be used without deviating from the scope of the invention.

Figure 10B:
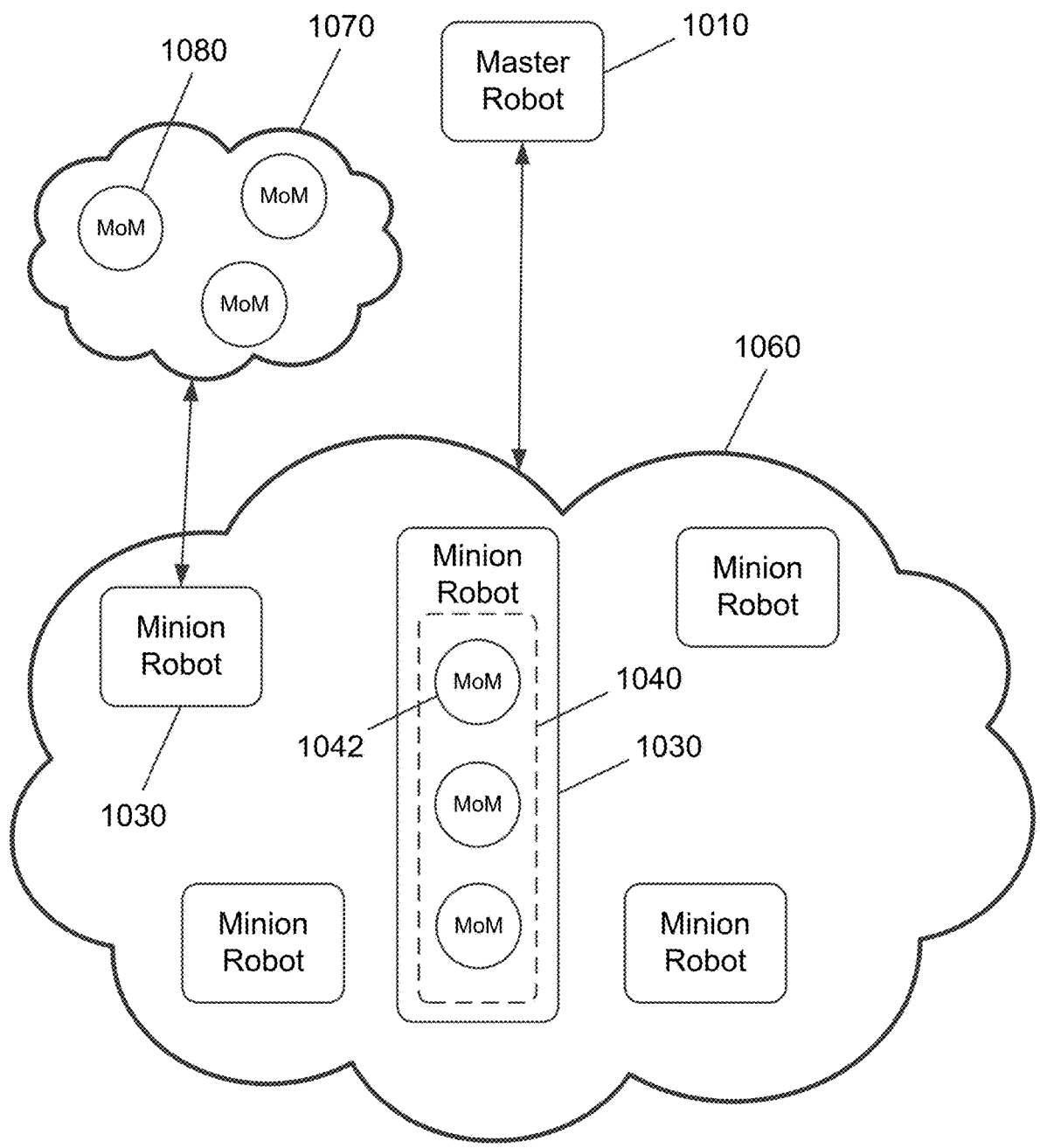
FIG. 10B illustrates an architecture where a master robot has access to minion robots in a pool, and a minion robot in the pool has its own embedded sub-minion or MoM robots, according to an embodiment of the present invention.

In some embodiments, nested minion robots may be included in a pool architecture. For example, FIG. 10B illustrates an architecture 1002 where master robot 1010 has access to minion robots 1030 in a pool 1060, and a minion robot 1030 in pool 1060 has its own embedded MoM robots 1050. In some embodiments, master robot 1010 may also have its own embedded or nested embedded minion robots. Master robot 1010 can call minion robots 1030 in the pool 1060, and minion robot 1030 including embedded MoM robots 1050 can call these. In this embodiment, one minion robot 1030 also has access to its own pool 1070 of minion robots 1080.

Figure 11:
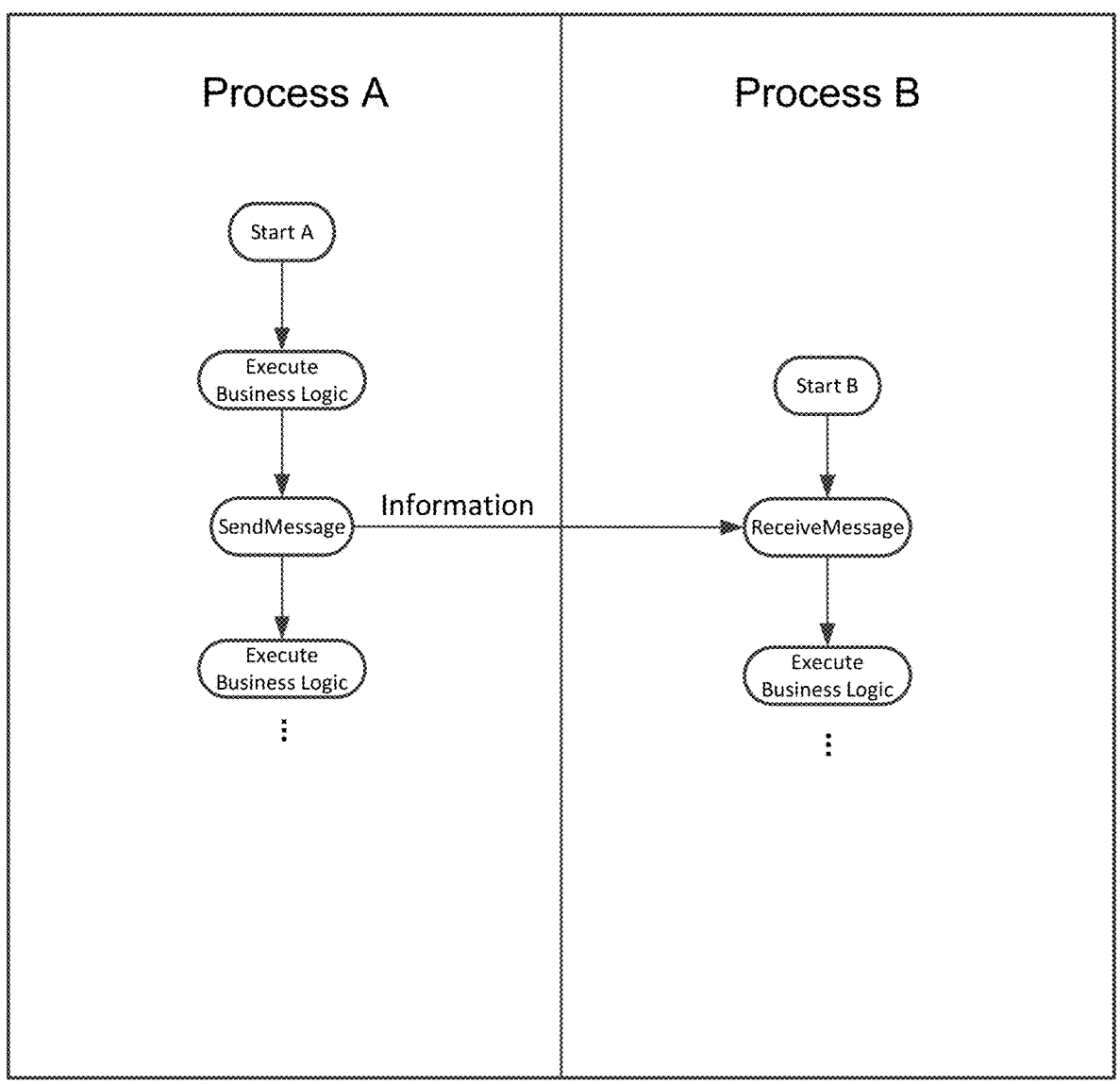
FIG. 11 is a flow diagram illustrating IPC communications between two processes via SendMessage and ReceiveMessage activities, according to an embodiment of the present invention.

When business logic is executing on multiple threads, as may be the case with robots running as background processes and parallel attended robot execution scenarios, for example, IPC may be beneficial in some embodiments to facilitate communication, data exchange, commands, synchronization, etc. between processes (e.g., RPA robots, processes associated with applications, etc.) on a computing system. Such IPC communications could also occur between processes running in different sessions, or between two workflows of the same process. In some embodiments, this may be accomplished via SendMessage and ReceiveMessage activities that enable passing information (e.g., communications, data, commands, synchronization information (e.g., time stamps), etc.) between processes. Such a scenario is shown in flow diagram 1100 of FIG. 11. In FIG. 11, process A and process B communicate via IPC. More specifically, a SendMessage activity of process A sends information to a ReceiveMessage activity of process B via IPC.

More complex scenarios are also possible. For example, in flow diagram 1200 of FIG. 12, two different types of messages are sent and received. Specifically, process B sends an "Invoice" message to process C and a "Report" message to process A.

The SendMessage activity may add a new message in a specified IPC channel. The channel name and message may be included as string arguments in some embodiments. However, any suitable arguments and/or data formats may be used without deviating from the scope of the invention.

The ReceiveMessage activity may be a trigger activity that receives the latest message in a specified IPC channel. In some embodiments, the ReceiveMessage activity may be triggered for each message that is received and may be executed for every message. If the associated process is handling one message while the next message is received, the next message may be stored for processing rather than losing the message. The ReceiveMessage activity may provide data about the sender process, such as the sender process name and process ID and/or job ID. The channel name, message, and sender may be included as arguments. However, any suitable arguments and/or data formats may be used without deviating from the scope of the invention.

It should be noted that other activity types are possible for IPC communication-related tasks. For instance, based on IPC communications, an activity may stop the current process, stop another process, fetch the currently running processes, etc. A RunParallelProcess activity may be provided in some embodiments that returns a process object that allows the parent process to control it.

In some embodiments, IPC messages are retrieved from a first in, first out (FIFO) message queue, and may be broadcast to listening processes in some embodiments. Such IPC messages may be sent via separate channels (e.g., communication connections). For example, one process may post messages into the Invoice channel, which are then consumed by multiple processes. When the SendMessage activity sends a message to a specific channel (e.g., as denoted by a channel name), in some embodiments, the processes that accept a client connection for this channel are detected (ReceiveMessage trigger activity). For each process that is detected, a connection may be created, and the message may be sent.

Figure 13:
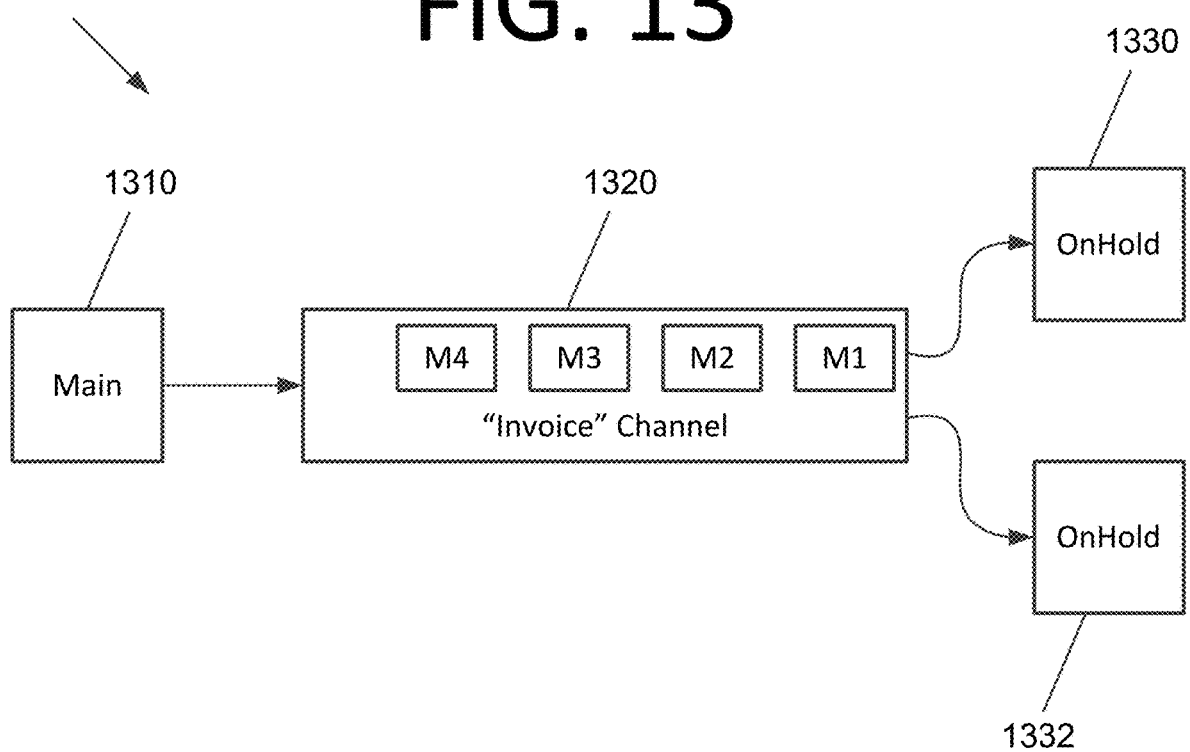
FIG. 13 illustrates message queue functionality for an "Invoice" channel, according to an embodiment of the present invention.

Such a scenario 1300 is shown in FIG. 13. In FIG. 13, a main process 1310 sends messages M1, M2, M3, M4 via Invoice channel 1320. Two processes with respective OnHold activities 1330, 1332 are listening for messages in invoice channel 1320. OnHold activities 1330, 1332 wait to receive messages (Receive Message trigger activity). While listening, each process associated with OnHold activities 1330, 1332 will receive messages M1-M4, and in that order.

In some embodiments, messages in a channel are sent to processes that are listening when they appear. If no process is listening, the messages may be dropped. For instance, a process may increment a counter and send the counter in a message every second in a "Counter" queue. If no processes are waiting for the messages after five seconds, messages 1-5 that were sent each second may be dropped. A process may then start listening from second six onwards, and the messages sent at seconds 6, 7, 8, 9, and 10 may then be received by this process. At second 11, another process may start listening as well, and the messages from seconds 11, 12, 13, etc. may then be received by both processes.

Figure 12:
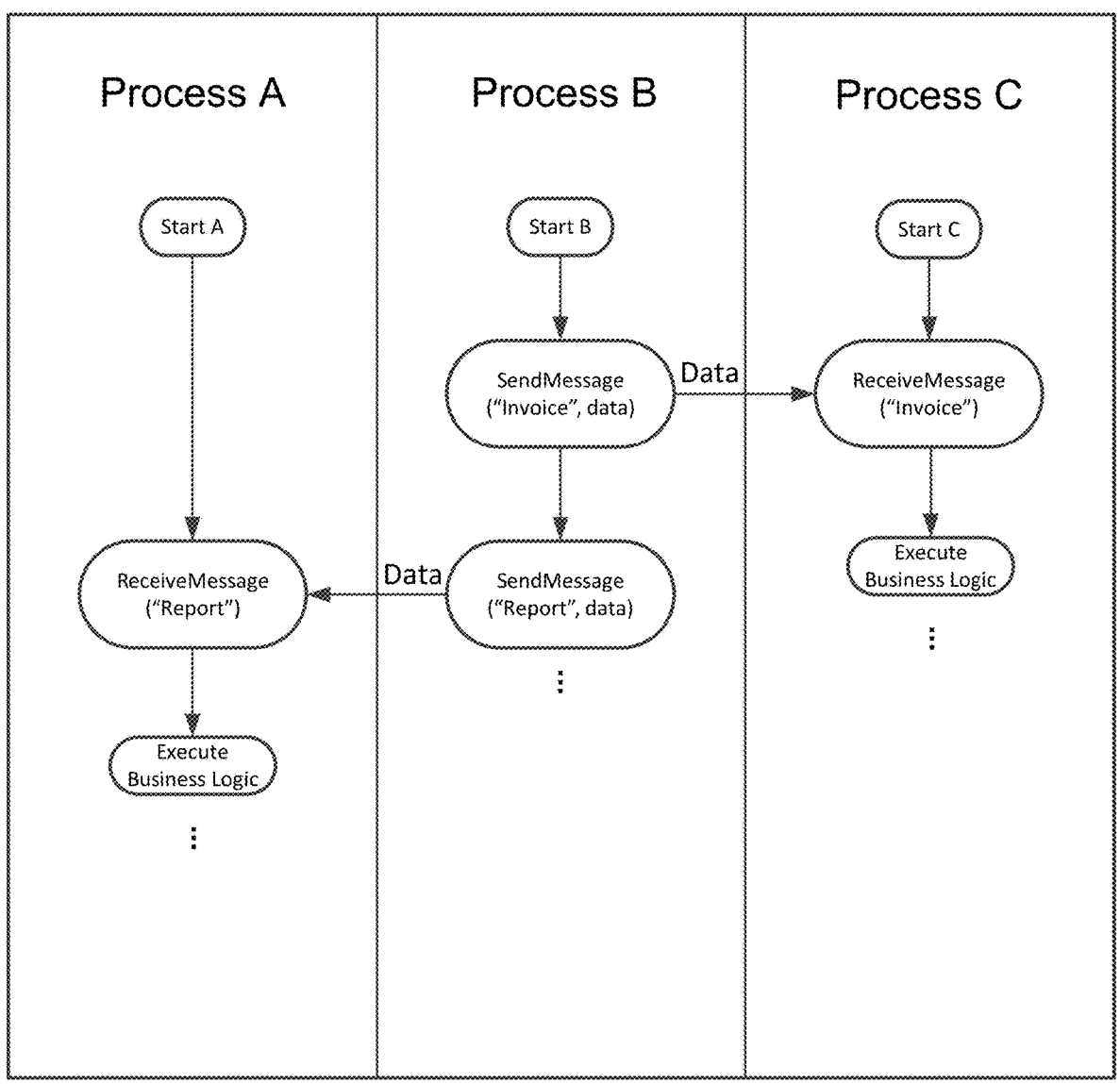
FIG. 12 is a flow diagram illustrating IPC communications between three processes via SendMessage and ReceiveMessage activities, according to an embodiment of the present invention.

It should be noted that the position of the elements in FIGS. 11-13 does not necessarily indicate an exact temporal relationship. For instance, the processes depicted therein and their components may start at different times. Also, the ReceiveMessage activities may not necessarily start concurrently with the SendMessage activities. For instance, the ReceiveMessage activities may be executed before the corresponding SendMessage activities, and they may wait until they receive a communication.

Figure 14:
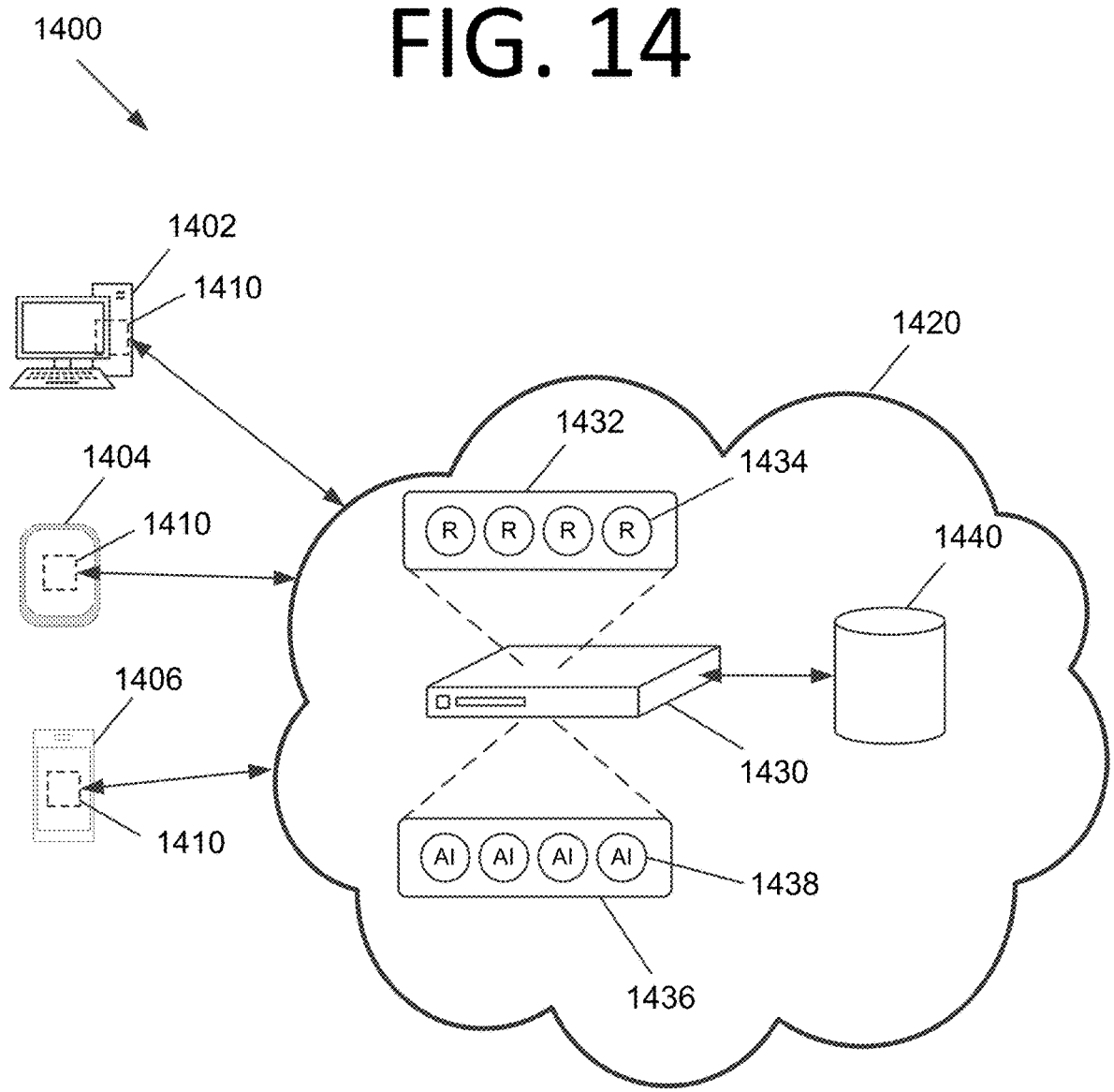
FIG. 14 is an architectural diagram illustrating a remote robot pool system, according to an embodiment of the present invention.

FIG. 14 is an architectural diagram illustrating a remote robot pool system 1400, according to an embodiment of the present invention. System 1400 includes user computing systems, such as desktop computer 1402, tablet 1404, and smart phone 1406. However, any desired computing system may be used without deviating from the scope of invention including, but not limited to, smart watches, laptop computers, Internet-of-Things (IoT) devices, vehicle computing systems, etc.

Each computing system 1402, 1404, 1406 has one or more processes 1410 running thereon. Processes 1410 may be master and/or minion robots generated via an RPA designer application, part of an operating system, a downloadable application for a personal computer (PC) or smart phone, or any other software and/or hardware without deviating from the scope of the invention. Indeed, in some embodiments, the logic of one or more of processes 1410 is implemented partially or completely via physical hardware.

Processes 1410 may not have the software and/or access permissions locally to accomplish certain tasks. However, another computing system and/or its robots may have these capabilities, and may be accessible via a cloud architecture, for example. Processes 1410 may send requests via a network 1420 (e.g., a local area network (LAN), a mobile communications network, a satellite communications network, the Internet, a public or private cloud, a hybrid cloud, a server farm, any combination thereof, etc.) to a server 1430. Server 1430 may have access to a database 1440 that contains various stored data.

Server 1430 runs a robot pool 1432 that includes robots 1434. Robots 1434 may be master and/or minion robots. Each of robots 1434 may perform a different task, at least some of robots 1434 may perform the same task, or all robots 1434 may perform the same task in some embodiments. Multiple robots that perform the same task may be useful, for instance, if it is likely that multiple requests may be received in close temporal proximity that request the same or a similar task to be performed. In some embodiments, at least one robot 1434 calls one or more AI/ML models 1438 from an AI/ML model pool 1436. In certain embodiments, AI/ML models 1438 may be located on a different computing system than server 1430.

When a request comes in, server 1430 assigns a robot 1434 to complete the requested task. The information associated with the task is then returned to calling process 1410. This information may include, but is not limited to, an indication that a task has been completed, a status report, information from a database, a combination thereof, etc.

It should be noted that communication between computing systems is not limited to client-server architectures. In some embodiments, robots of a computing system of any desired type may communicate with robots of another computing system of any desired type. Such communications could occur via TCP/IP, for example, where the robots have port listener functionality that listens for communications from other robots. This may be useful for cloud embodiments, for example.

FIG. 15 is a flowchart illustrating a process 1500 for implementing embedded and/or pooled RPA robot functionality, according to an embodiment of the present invention. The process begins with determining, by a master RPA robot, that a task should be executed by a minion RPA robot at 1505. In some embodiments, the determination by the master RPA robot that the task should be completed by the minion RPA robot includes determining, by the master RPA robot, that a next action of the master RPA robot is unknown or that information to complete the next step in the workflow of the master RPA robot is unknown and receiving, by the master RPA robot, a next action to take, missing data, and/or which branch in the workflow to take from the minion RPA robot based on the execution of the task. In certain embodiments, the determination by the master RPA robot that the task should be completed by the minion RPA robot includes calling an ML model, by the master RPA robot, receiving a result from execution of the ML model, by the master RPA robot, and using the result of the execution of the ML model to determine which minion RPA robot of a plurality of minion RPA robots should be called, by the master RPA robot.

The master RPA robot then sends a request to execute the task to the minion RPA robot at 1510. In some embodiments, the master RPA robot suspends execution of its workflow until the minion RPA robot has completed the task at 1515. However, in some embodiments, the master RPA robot continues execution of the workflow while the minion RPA robot performs the task in parallel. The minion RPA robot executes the task based on the request from the master RPA robot at 1520. In some embodiments, the minion RPA robot causes another minion RPA robot to execute at 1525 and the minion RPA robot receives and uses information from the execution of the other minion RPA robot to complete the task at 1530.

The minion RPA robot provides information to the master RPA robot pursuant to the execution of the task at 1535. The master RPA robot receives the information from the minion RPA robot pursuant to the execution of the task at 1540. The master RPA robot then uses the information received from the minion RPA robot to complete at least one activity associated with a workflow of the master RPA robot at 1545.

In some embodiments, the minion RPA robot is embedded within the master RPA robot, the minion RPA robot is part of a robot pool, or both. In certain embodiments, the minion RPA robot executes on a different computing system than the master RPA robot. In some embodiments, the master RPA robot causes a plurality of minion RPA robots to execute to complete a larger task. In certain embodiments, the plurality of minion RPA robots execute in series. In some embodiments, the plurality of minion RPA robots execute in parallel.

In some embodiments, communications between the master RPA robot and the minion RPA robot occur via IPC while the minion RPA robot is executing the task. In certain embodiments, the IPC communication comprises one or more commands, one or more time stamps, or both. In some embodiments, the IPC communications between the master RPA robot and the minion RPA robot are sent and received via an IPC channel comprising a queue of IPC messages.

The process steps performed in FIG. 15 may be performed by a computer program, encoding instructions for the processor(s) to perform at least part of the process(es) described in FIG. 15 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 15, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the computer program configured to cause at least one processor to:
    determine, by a master robotic process automation (RPA) robot, that a task should be executed by a minion RPA robot;
    send a request to execute the task to the minion RPA robot, by the master RPA robot;
    receive, by the master RPA robot, information from the minion RPA robot pursuant to the execution of the task; and
    use the information received from the minion RPA robot, by the master RPA robot, to complete at least one activity associated with a workflow of the master RPA robot.

2. The computer program of claim 1, wherein the minion RPA robot is embedded within the master RPA robot.

3. The computer program of claim 1, wherein the minion RPA robot is part of a robot pool.

4. The computer program of claim 1, wherein the minion RPA robot executes on a different computing system than the master RPA robot.

5. The computer program of claim 1, wherein the determination by the master RPA robot that the task should be completed by the minion RPA robot comprises:
    determining, by the master RPA robot, that a next action of the master RPA robot is unknown or that information to complete the next step in the workflow of the master RPA robot is unknown; and
    receiving, by the master RPA robot, a next action to take, missing data, and/or which branch in the workflow to take from the minion RPA robot based on the execution of the task.

6. The computer program of claim 1, wherein the computer program is further configured to cause the at least one processor to:
    suspend execution of the workflow, by the master RPA robot, until the minion RPA robot has completed the task.

7. The computer program of claim 1, wherein the master RPA robot continues execution of the workflow while the minion RPA robot performs the task in parallel.

8. The computer program of claim 1, wherein the master RPA robot causes a plurality of minion RPA robots to execute to complete a larger task.

9. The computer program of claim 8, wherein the plurality of minion RPA robots execute in series.

10. The computer program of claim 8, wherein the plurality of minion RPA robots execute in parallel.

11. The computer program of claim 1, wherein the program is further configured to cause the at least one processor to:
    cause another minion RPA robot to execute, by the minion RPA robot;
    receive, by the minion RPA robot, information from the other minion RPA robot pursuant to the execution of the other minion RPA robot; and
    use the received information from the other minion RPA robot to complete the task, by the minion RPA robot.

12. The computer program of claim 1, wherein the program is further configured to cause the at least one processor to:
    call a machine learning (ML) model, by the master RPA robot;
    receive a result from execution of the ML model, by the master RPA robot; and
    use the result of the execution of the ML model to determine which minion RPA robot of a plurality of minion RPA robots should be called, by the master RPA robot.

13. The computer program of claim 1, wherein communications between the master RPA robot and the minion RPA robot occur via IPC while the minion RPA robot is executing the task.

14. The computer program of claim 13, wherein the IPC communication comprises one or more commands, one or more time stamps, or both.

15. The computer program of claim 13, wherein the IPC communications between the master RPA robot and the minion RPA robot are sent and received via an IPC channel comprising a queue of IPC messages.

16. A computer-implemented method, comprising:
determining, by a master robotic process automation (RPA) robot, that a task should be executed by a minion RPA robot;
sending a request to complete the task to the minion RPA robot, by the master RPA robot;
executing the task, by the minion RPA robot, based on the request from the master RPA robot;
receiving, by the master RPA robot, information from the minion RPA robot pursuant to the execution of the task; and
using the information received from the minion RPA robot, by the master RPA robot, to complete at least one activity associated with a workflow of the master RPA robot.

17. The computer-implemented method of claim 16, wherein the minion RPA robot is embedded within the master RPA robot.

18. The computer-implemented method of claim 16, wherein the minion RPA robot is part of a robot pool.

19. The computer-implemented method of claim 16, wherein the minion RPA robot executes on a different computing system than the master RPA robot.

20. The computer-implemented method of claim 16, wherein the determination by the master RPA robot that the task should be completed by the minion RPA robot comprises:
determining, by the master RPA robot, that a next action of the master RPA robot is unknown or that information to complete the next step in the workflow of the master RPA robot is unknown;
determining, by the minion RPA robot, a next action to take, missing data, and/or which branch in the workflow to take based on the execution of the task; and
receiving, by the master RPA robot, the next action to take, the missing data, and/or which branch in the workflow to take from the minion RPA robot.

21. The computer-implemented method of claim 16, further comprising:
suspending execution of the workflow, by the master RPA robot, until the minion RPA robot has completed the task.

22. The computer-implemented method of claim 16, further comprising:
causing another minion RPA robot to execute, by the minion RPA robot;
receiving, by the minion RPA robot, information from the other minion RPA robot pursuant to the execution of the other minion RPA robot; and
using the received information from the other minion RPA robot to complete the task, by the minion RPA robot.

23. The computer-implemented method of claim 16, further comprising:
calling a machine learning (ML) model, by the master RPA robot;
receiving a result from execution of the ML model, by the master RPA robot; and
using the result of the execution of the ML model to determine which minion RPA robot of a plurality of minion RPA robots should be called, by the master RPA robot.

24. The computer-implemented method of claim 16, wherein communications between the master RPA robot and the minion RPA robot occur via IPC while the minion RPA robot is executing the task.

25. The computer-implemented method of claim 24, wherein the IPC communications between the master RPA robot and the minion RPA robot are sent and received via an IPC channel comprising a queue of IPC messages.

26. A computer program embodied on a non-transitory computer-readable medium, the computer program configured to cause at least one processor to:
receive a request to execute a task from a master robotic process automation (RPA) robot, by a minion RPA robot;
execute the task, by the minion RPA robot, based on the request from the master RPA robot; and
provide information to the master RPA robot pursuant to the execution of the task, by the minion RPA robot, wherein
the minion RPA robot is embedded within the master RPA robot, the minion RPA robot is part of a robot pool, or both.

27. The computer program of claim 26, wherein the minion RPA robot executes on a different computing system than the master RPA robot.

28. The computer program of claim 26, wherein communications between the master RPA robot and the minion RPA robot occur via IPC while the minion RPA robot is executing the task.

29. The computer program of claim 28, wherein the IPC communications between the master RPA robot and the minion RPA robot are sent and received via an IPC channel comprising a queue of IPC messages.

* * * * *